Patented Nov. 29, 1949

2,489,569

UNITED STATES PATENT OFFICE 2,489,569

PROCESS OF CONCENTRATING SOLUTIONS OF SYNTHETIC LINEAR POLYAMIDES

Robinson Percy Foulds and William Hilton Roscoe, Manchester, England, assignors to Tootal Broadhurst Lee Company Limited, Manchester, England No Drawing. Application October 24, 1947, Serial No. 782,024. In Great Britain November 1, 1946

8 Claims. (Cl. 260—30.8)

1

The present invention relates to improvements in the preparation of solutions or dispersions of synthetic linear polyamides including polyamide interpolymers especially linear superpolyamides.

In United States patent application Serial No. 524,105, R. P. Foulds, filed February 26, 1944, now abandoned, and in continuation application Serial No. 764,575, R. P. Foulds, filed July 29, 1947, there is described a process of treating fibrous material which consists in applying to it a liquid solution of water insoluble synthetic linear polyamide in strong acid and then precipitating the polyamide on said material by an aqueous medium which is substantially non-solvent for said polyamide.

Synthetic linear polyamides are known in commerce as "nylon" and are organic condensation products which contain a multiplicity of structural units linked in series by amide or thioamide groupings, produced by a process of manufacture in which non-fiber-forming organic substances of lower molecular weight are converted into products of such high molecular weight as to be capable of being formed into filaments which upon cold drawing acquire a true fiber structure recognisable by X-ray examination. When used in reference to textile art, the term "nylon" is not customarily applied to synthetic polyamides which are water-soluble. The present invention is concerned with water-insoluble, high molecular weight or fiber-forming polyamides soluble in strong acid such as are described in United States patent specification No. 2,071,250, Wallace H. Carothers, patented February 16, 1937; United States patent specification No. 2,071,253, Wallace H. Carothers, patented February 16, 1937, and United States patent specification No. 2,130,948, Wallace H. Carothers, patented September 20, 1938.

It will be apparent therefore, that many of these synthetic linear polyamides are made from alkylene diamines and higher aliphatic dicarboxylic acids. Examples of these are polyalkylenediamine adipates and polyalkylenediamine sebacates.

For many purposes and in particular for the purpose of carrying out the process described in the aforesaid patent application Serial Nos. 524,-105 and 764,575, it is useful to have solutions of synthetic linear polyamides in mineral acids in which the proportion of polyamide is high. Some difficulty is encountered in making such solutions owing to the slowness with which the polyamides dissolve in mineral acids already containing substantial amounts of polyamides in solu-

2 tion. Moreover, as is well known, synthetic linear polyamides are hydrolysed by mineral acids. Although the rate of hydrolysis is slow enough to enable such solutions to be made and used, the polyamide does become degraded when the solutions are allowed to stand for any lengthy period e. g. over one or two days.

One object of the present invention is to provide solutions containing high proportions of synthetic linear polyamides in mineral acids. Another object is to concentrate solutions of polyamides in mineral acids thereby to obtain solutions containing a higher proportion of polyamide than can conveniently be produced by direct dissolution of the polyamides in acids. Another object is to produce solutions of high viscosity containing synthetic linear polyamides in mineral acids. Another object is to produce solutions of synthetic linear polyamides in acids which only degrade slowly on standing. Another object is to produce solutions of synthetic linear polyamides in sulphuric acid which can be kept for several days at atmospheric temperature without serious degradation.

It has been found that if a solution is first made by dissolving a synthetic linear polyamide, or two or more different synthetic linear polyamides, in hydrochloric, sulphuric, nitric or phosphoric acid and in this solution is dissolved sufficient of a salt of hydrochloric, sulphuric, nitric or phosphoric acid which is soluble in the acid in which the polyamide is dissolved, then the solution separates into two layers, one consisting substantially of acid and salt and containing very little polyamide and the other substantially of a solution of the polyamide in acid and containing very little salt. The two layers may be separated from one another in any convenient manner to enable each to be isolated. The last mentioned layer contains a very high proportion of synthetic linear polyamide and can be used for whatever purpose a highly concentrated solution of such polyamide in acid is required.

As will be appreciated, solutions of synthetic linear polyamides in mineral acids may not in all cases be true solutions but have many of the characteristics of dispersions owing to the high molecular weight of the polyamides. This is particularly true of the solutions containing high proportions of polyamides. Nevertheless the liquid solutions appear homogeneous and do not exhibit any settling of the polyamide so that, for convenience, we shall herein refer to solutions whatever the concentration may be.

A solution of polyamide in one of the four mineral acids named above does not separate into two layers until a certain minimum amount of the salt has been dissolved therein. The minimum amount required depends upon the nature of the polyamide, the nature of the acid, the quantity of water in the acid, the concentration of the polyamide in the acid, the nature of the salt and the temperature employed. It is found in some cases that some salts may be insufficiently soluble to bring about separation into two layers, an example of this being aluminium sulphate in the case of a solution made by dissolving the synthetic linear polyamide obtained from hexamethylene diamine and adipic acid in aqueous 45% by weight sulphuric acid. In the examples hereinafter given, all of which are carried out at room temperature, the amount of salt employed is approximately the minimum which will cause separation into two layers. Larger quantities are unnecessary but can be employed in most cases giving rise to a higher concentration of polyamide in the layer containing the larger proportion of this. However, in some cases it is possible for the solution to dissolve so much of the salt that the layer containing the larger proportion of polyamide is not homogeneous and may even show a gel formation: this is usually undesirable.

The salt used must be such that it will not react undesirably with the acid or acids in which the polyamide has been dissolved. We have found it convenient, although not always essential, to use a salt of the acid actually used to dissolve the polyamide, for example sodium sulphate in the case where sulphuric acid has been used as the acid solvent. The salt may be for example the salt of an alkali metal, of ammonium, of an alkaline earth metal, or of zinc, or of magnesium. Mixtures of salts or mixed salts may be used.

By the present invention, it is possible to make solutions of synthetic linear polyamides in hydrochloric, sulphuric, nitric or phosphoric acid containing high proportions of polyamide more easily than by directly dissolving such high proportion of polyamide in such acid. Indeed, we have not been able to prepare, by directly dissolving the polyamide in the acid, some of the highly concentrated solutions obtainable by the process of the present invention and these highly concentrated solutions are believed to be novel. Thus, the invention enables solutions of synthetic linear polyamides to be made in sulphuric acid, for example aqueous 45% by weight sulphuric acid, containing more than 20 grams of polyamide and even more than 25 grams of polyamide per 100 cc. of liquor as well as solutions of synthetic linear polyamides in hydrochloric acid, for example aqueous 20% by weight hydrochloric acid, containing more than 25 grams of polyamide per 100 c.c. of liquor and solutions of synthetic linear polyamides in nitric acid for example aqueous 63% by weight nitric acid, containing more than 25 grams of polyamide per 100 c.c. of liquor.

The solutions of synthetic linear polyamides in mineral acids prepared by the present invention show less tendency to degradation than solutions made by directly dissolving the polyamide in the mineral acid. Accordingly, they can be kept for longer times without the film forming properties of the polyamide being destroyed. Indeed in most cases the concentrated solutions obtained by the invention show less tendency to degradation than the solutions of lower polyamide content from which they were made.

Fibrous or other materials may be treated with solutions of synthetic linear polyamides in hydrochloric, sulphuric, nitric or phosphoric acid concentrated by the process of the present invention. For example, paper or textile materials may be treated with the dispersion and then passed through an aqueous medium such as water to deposit the polyamide from the dispersion on to the paper or fabric as a filler or coating. The polyamide may be precipitated locally to produce pattern effects.

These solutions of synthetic linear polyamides made by the present invention are not only of a comparatively high concentration but are also of a comparatively high viscosity and as a result of this, when they are applied to a porous material, such as a textile fabric, they tend to remain very largely on the surface of the fabric. This enables glazed effects on fabrics to be obtained by precipitation of the synthetic linear ployamide more easily than from less viscous solutions which are absorbed by the fabric. By the use of these viscous solutions a glazed effect can be obtained merely by precipitating, neutralizing and drying but this effect can be enhanced by calendering. When dyed effects are to be produced or coloured pattern effects are to be produced by printing a dyestuff on selected areas of the fabric, it may be preferable that the dyestuff should be applied after the polyamide has been precipitated on to the fabric.

Threads or films may be made by coagulation of solutions concentrated by the process of the present invention, with an aqueous medium or an aqueous alkaline medium or an alkaline medium.

The invention will be illustrated by but is not limited to the following examples.

*Example 1*

5 grams of the synthetic linear polyamide obtained from hexamethylene diamine and adipic acid by the method described in British patent specification No. 474,999 and having a melting point of about 248° C. were dissolved in 100 c.c. of aqueous 45% by weight sulphuric acid.

The volume of the solution obtained was substantially greater than 100 c.c. so that the concentration of polyamide was less than 5 grams per 100 c.c. 7 grams of sodium chloride were dissolved in this solution which thereupon divided into two layers. The upper layer comprised 19.4 c.c. of a solution of containing 20.2 grams per 100 c.c. of the polyamide and very little dissolved salt. The lower layer comprised 87.3 c.c. of a clear liquor containing substantially all the salt and only 1.02 grams of polyamide.

*Example 2*

The procedure was as in Example 1 except that the initial solution was made by dissolving 10 grams of the stated polyamide in 100 c.c. of aqueous 45% by weight sulphuric acid. After solution of the sodium chloride and separation into two layers the upper layer comprised 42.7 c.c. of a solution of polyamide containing 21.3 grams per 100 c.c. of the polyamide and very little dissolved salt. The lower layer comprised 68.1 c.c. of a clear liquor containing substantially all the salt and only 0.7 gram of polyamide.

*Example 3*

The procedure was as in Example 2 except that 7.54 grams of sodium sulphate (anhydrous) were used instead of 7 grams of sodium chloride. The upper layer comprised 56 c.c. of a solution containing 9.50 grams of polyamide (17.0 grams per 100 c.c.) and 2.02 grams of sodium sulphate and the lower layer comprised 57 c.c. of a clear liquor containing 5.25 grams of sodium sulphate and 0.3 gram of polyamide. There was an inevitable slight loss of material in separating the layers.

Example 4

20 grams of the synthetic linear polyamide referred to in Example 1 were dissolved in 100 c.c. of aqueous 45% by weight sulphuric acid. The volume of the resulting solution was about 120 c.c. so that it contained 16.7 grams of polyamide per 100 c.c. 9.5 grams of sodium sulphate (anhydrous) were dissolved in this solution which thereupon separated into two layers of which the upper one contained 25.7 grams of polyamide per 100 c.c. whereas the lower layer contained less than 0.5 gram of the polyamide.

Example 5

The procedure was as in Example 4 but using 19.5 grams of zinc sulphate (heptahydrate) instead of 9.5 grams of sodium sulphate. After separation into two layers, the upper layer contained 26.3 grams of polyamide per 100 c.c.

Example 6

The procedure was as in Example 4 but using 14 grams of ammonium sulphate instead of 9.5 grams of sodium sulphate. After separation into two layers, the upper layer contained 26.0 grams of polyamide per 100 c.c.

Example 7

The procedure was as in Example 4 but using 16.5 grams of magnesium sulphate (heptahydrate) instead of 9.5 grams of sodium sulphate. After separation into two layers, the upper layer contained 27.0 grams of polyamide per 100 c.c.

Example 8

The procedure was as in Example 4 but using 6.5 grams of sodium chloride instead of 9.5 grams of sodium sulphate. After separation into two layers, the upper layer contained 26.9 grams of polyamide per 100 c.c.

Example 9

The procedure was as in Example 4 but using 10 grams of ammonium sulphate and 1 gram of sodium sulphate (anhydrous), instead of 9.5 grams of sodium sulphate. A similar result was obtained as in Example 8.

Example 10

40 grams of the synthetic linear polyamide referred to in Example 1 were dissolved in 100 c.c. of aqueous 45% by weight sulphuric acid. The resulting solution contained 28.6 grams of polyamide per 100 c.c. 8 grams of sodium sulphate (anhydrous) were dissolved in this solution which thereupon separated into two layers. The upper layer contained 32.0 grams of polyamide per 100 c.c. but was not homogeneous.

Example 11

20 grams of the synthetic linear polyamide referred to in Example 1 were dissolved in 100 c.c. of aqueous 20% by weight hydrochloric acid 6.5 grams of zinc chloride were dissolved in the solution which thereupon separated into two layers of which the lower layer contained the greater part of the polyamide with very little salt in solution, while the upper layer was a clear liquor containing most of the salt and a very small proportion of the polyamide. Addition of a larger amount of zinc chloride caused the lower layer to gel.

Example 12

The procedure was as in Example 11 but using 3.75 grams of sodium chloride instead of 6.5 grams of zinc chloride. After separation into two layers, the lower layer contained 28.0 grams of polyamide per 100 c.c.

Example 13

The procedure was as in Example 11 but using 2.75 grams of ammonium chloride instead of 6.5 grams of zinc chloride. After separation into two layers, the lower layer contained 24.6 grams of polyamide per 100 c.c.

Example 14

The procedure was as in Example 11 but using 7.0 grams of magnesium chloride (hexahydrate) instead of 6.5 grams of zinc chloride. After separation into two layers, the lower layer contained 25.5 grams of polyamide per 100 c.c.

Example 15

20 grams of the synthetic linear polyamide referred to in Example 1 were dissolved in 100 c. c. of aqueous 63% by weight nitric acid. On adding sodium nitrate to the solution, insufficient would dissolve to bring about separation into two layers. It was found, however, that on dissolving 17 grams of potassium nitrate in the solution, this separated into two layers of which the upper layer 71 c. c. contained the greater part of the polyamide with very little salt in solution, while the lower layer (56 c. c.) was a clear liquor containing most of the salt and a very small proportion of the polyamide. The amount of polyamide in the upper layer was 27.1 grams per 100 c. c.

Example 16

The procedure was as in Example 15 but using 15.0 grams of ammonium nitrate instead of 17.0 grams of potassium nitrate. After separation into two layers, the upper layer (80 c. c) contained 24.0 grams of polyamide per 100 c. c. while the lower layer (51 c. c) contained very little polyamide.

When an attempt was made to replace the ammonium nitrate with ammonium chloride, some reaction seemed to occur and nitric oxide was evolved.

Example 17

10 grams of the synthetic linear polyamide referred to in Example 1 were dissolved in 100 c. c. of aqueous orthophosphoric acid (90% by weight $H_3PO_4$). The polyamide dissolved very slowly and dissolution took about five hours. 23 grams of trisodium phosphate were dissolved in the solution which thereupon separated into two layers of which the upper layer (51 c. c) contained the greater part of the polyamide (19.6 grams per 100 c. c.) with very little salt in solution, while the lower layer (77 c. c.) was a clear liquor containing most of the salt and a very small proportion of the polyamide.

Example 18

6 grams of the synthetic linear polyamide referred to in Example 1 were dissolved in 100 c. c. of aqueous orthophosphoric acid (90% by weight H₃PO₄) 34 grams of ammonium dihydrogen phosphate were dissolved in the solution which thereupon separated into two layers of which the upper layer (30 c. c) contained the greater part of the polyamide (20.0 grams per 100 c. c.) with very little salt in solution, while the lower layer (110 c. c.) was a clear liquor containing most of the salt and a very small proportion of the polyamide.

Sodium chloride was found to be insufficiently soluble in the solution to bring about separation into two layers.

*Example 19*

20 grams of the synthetic linear polyamide obtained from hexamethylene diammonium adipate and aminostearic acid by the method described in British patent specification No. 559,514 and having a melting range of 135–160° C. were dissolved in 100 c. c. of aqueous 45% by weight sulphuric acid, 5.5 grams of sodium chloride were dissolved in the solution which thereupon separated into two layers of which the upper layer (68.5 c. c.) contained the greater part of the polyamide (27.8 grams per 100 c. c.) with very little salt in solution, while the lower layer (33.6 c. c.) was a clear liquor containing most of the salt and a very small proportion of the polyamide (0.18 gram).

The invention is not limited to the preparation of solutions of the polyamides employed in the above examples. Solutions of other polyamides may be made by the process of the present invention which may, indeed, be applied to any synthetic linear polyamide which is soluble in hydrochloric, sulphuric, nitric or phosphoric acid.

For example, the polyamide obtained from ethylene diamine and sebacic acid having a melting point of about 254° C. (see United States patent specification No. 213,948) or the polyamide obtained from tetramethylenediamine and adipic acid having a melting point of about 278° C. (see British patent specification No. 474,999) or the polyamide obtained from paraxylylenediamine and sebacic acid and having a melting point of about 268° C. or the polyamide obtained from pentamethylenediamine and brassylic acid and having a melting point of about 176° C. (see United States patent specification No. 2,130,948), may be used.

It is known that synthetic linear polyamides are degraded by strong acids. Although solutions in hydrochloric, sulphuric, nitric or phosphoric acid can be made which show little or not degradation when fresh, degradation takes place on standing. It is one of the important advantages of the present invention that solutions of polyamides prepared by the process of the invention give more permanent effects when used for treating materials than solutions of the same strength made by directly dissolving the polyamide in the mineral acid, when both have been kept for some time due to less degradation of the polyamide. This can readily be tested. Two methods are available.

1. A thin coating of the two comparative mineral acid solutions is spread on a glass plate and treated with water to precipitate the polyamide. The polyamide precipitates from the solutions made according to the present invention adheres strongly and eventually washes off as a film whereas the polyamide precipitated from direct acid solution washes off more easily and in powdery form.

2. A thin coating of the two comparative mineral acid solutions is spread on samples of a light weight cotton fabric. The samples are then treated with water to precipitate the polyamide and then washed with sodium carbonate solution and with water to neutralise all the acid. They are then hot pressed and subjected to washing and rubbing. The polyamide precipitated from the solutions made according to the present invention show much greater adherence, resisting rubbing and washing better than polyamide precipitated from direct acid solution.

For example, the solution of polyamide employed in Example 4 containing 16.7 grams of polyamide per 100 c. c. as well as the product of that example containing 25.9 grams of polyamide per 100 c. c. gave excellent coverings when precipitated on cotton fabrics by means of water immediately after making and when hot pressed. These coverings adhered strongly, resisting washing and rubbing.

When cotton fabrics were treated with the same solutions which had stood for 6 days, the polyamide precipitated from the second mentioned solution was more resistant to removal by washing and rubbing than the polyamide precipitated from the first mentioned solution. The products of Examples 5, 6, 7 and 8 behaved similarly to the second mentioned solution.

The solutions obtained from Examples 11 to 14 showed similar improvement as compared with direct acid solutions but the improvement of the solutions obtained from Examples 15 and 16 was most striking since nitric acid is extremely active in degrading polyamides.

For example the product obtained by Examples 15 and 16 even after standing for 3 days gave a covering on the cotton fabric which was more resistant to removal by washing and rubbing than the covering on the cotton fabric obtained from a solution of 20 grams of polyamide in 100 c. c. of aqueous 63% nitric acid after standing only two days.

We declare that what we claim is:

1. The process of concentrating a solution of synthetic linear polyamide made from alkylene diamine and an aliphatic dicarboxylic acid, in acid selected from the group which consists of hydrochloric acid, sulphuric acid, nitric acid and phosphoric acid which comprises dissolving in said solution sufficient of a salt of an acid selected from the said group to cause the solution to separate into two layers one of which contains a higher concentration of said synthetic linear polyamide than the other and isolating the layer containing a higher concentration of said synthetic linear polyamide.

2. The process as claimed in claim 1 wherein the salt is a salt of the acid in which the said synthetic linear polyamide is dissolved.

3. The process of concentrating a solution of synthetic linear polyamide made from alkylene diamine and an aliphatic dicarboxylic acid, in acid selected from the group which consists of hydrochloric acid, sulphuric acid, nitric acid and phosphoric acid which comprises dissolving in said solution sufficient sodium chloride to cause the solution to separate into two layers one of which contains a higher concentration of said synthetic linear polyamide than the other and isolating the layer containing a higher concentration of said synthetic linear polyamide.

4. The process of concentrating a solution of synthetic linear polyamide made from alkylene diamine and an aliphatic dicarboxylic acid, in acid selected from the group which consists of hydrochloric acid, sulphuric acid, nitric acid and phosphoric acid which comprises dissolving in said solution sufficient sodium sulphate to cause the solution to separate into two layers one of which contains a higher concentration of said synthetic linear polyamide than the other and isolating the layer containing a higher concentration of said synthetic linear polyamide.

5. The process of making a solution of synthetic linear polyamide made from alkylene diamine and an aliphatic dicarboxylic acid which comprises dissolving said synthetic linear polyamide in sulphuric acid in the relative proportions of 5 to 20 grams of said synthetic linear polyamide to each 100 c. c. of sulphuric acid, dissolving in the solution sodium chloride in the proportion of at least 7 grams for each 100 c. c. of sulphuric acid to cause separation of the solution into two layers one of which contains a higher concentration of said synthetic linear polyamide than the other and isolating the layer containing a higher concentration of said synthetic linear polyamide.

6. The process of making a solution of synthetic linear polyamide made from alkylene diamine and an aliphatic dicarboxylic acid which comprises dissolving said synthetic linear polyamide in sulphuric acid in the relative proportions of 5 to 20 grams of said synthetic linear polyamide to each 100 c. c. of sulphuric acid, dissolving in the solution sodium sulphate in the proportion of at least 9.5 grams for each 100 c. c. of sulphuric acid to cause separation of the solution into two layers one of which contains a higher concentration of said synthetic linear polyamide than the other and isolating the layer containing a higher concentration of said synthetic linear polyamide.

7. The process as claimed in claim 5 in which the strength of the sulphuric acid is substantially 45% by weight.

8. The process as claimed in claim 6 in which the strength of the sulphuric acid is substantially 45% by weight.

ROBINSON PERCY FOULDS.
WILLIAM HILTON ROSCOE.

REFERENCES CITED

The following references are of record in the file of this patent:

UNITED STATES PATENTS

| Number | Name | Date |
|---|---|---|
| 2,141,169 | Catlin | Dec. 27, 1938 |
| 2,342,387 | Catlin | Feb. 22, 1944 |
| 2,388,278 | Moncrieff et al. | Nov. 6, 1945 |